(12) United States Patent
Oguchi

(10) Patent No.: US 9,450,867 B2
(45) Date of Patent: Sep. 20, 2016

(54) APPARATUS AND METHOD FOR CONTROLLING TRANSMISSION BETWEEN RELAY DEVICES

(71) Applicant: FUJITSU LIMITED, Kawasaki-shi, Kanagawa (JP)

(72) Inventor: Naoki Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 79 days.

(21) Appl. No.: 14/309,718

(22) Filed: Jun. 19, 2014

(65) Prior Publication Data

US 2015/0009999 A1  Jan. 8, 2015

(30) Foreign Application Priority Data

Jul. 2, 2013 (JP) ................................. 2013-138917

(51) Int. Cl.
*H04L 1/00* (2006.01)
*H04L 12/721* (2013.01)
*H04L 29/06* (2006.01)

(52) U.S. Cl.
CPC ............... *H04L 45/72* (2013.01); *H04L 63/00* (2013.01); *H04L 69/16* (2013.01)

(58) Field of Classification Search
CPC ........ H04L 45/72; H04L 69/16; H04L 63/00
See application file for complete search history.

(56) References Cited

U.S. PATENT DOCUMENTS

| | | | | |
|---|---|---|---|---|
| 7,924,761 | B1 * | 4/2011 | Stevens | H03M 13/3761 370/315 |
| 2003/0219034 | A1 * | 11/2003 | Lotter | H04L 41/0823 370/469 |
| 2005/0058131 | A1 * | 3/2005 | Samuels | H04L 12/24 370/389 |
| 2008/0317017 | A1 * | 12/2008 | Wiemann | H04L 1/0002 370/389 |
| 2009/0003378 | A1 * | 1/2009 | Sachs | H04L 1/16 370/466 |
| 2009/0177787 | A1 * | 7/2009 | Ishikawa | H04L 69/163 709/228 |
| 2009/0177788 | A1 * | 7/2009 | Ishikawa | H04L 69/163 709/228 |
| 2009/0323770 | A1 * | 12/2009 | Venkatachalam | H04L 1/188 375/133 |

(Continued)

FOREIGN PATENT DOCUMENTS

JP          11-46217 A    2/1999

OTHER PUBLICATIONS

Balakrishnan et al., "Improving TCP/IP Performance over Wireless Networks," Computer Science Division, University of California at Berkley, Nov. 1995, 10 pages.

(Continued)

*Primary Examiner* — Clemence Han
(74) *Attorney, Agent, or Firm* — Arent Fox LLP

(57) ABSTRACT

A relay device is arranged on a path of a Transmission Control Protocol (TCP) packet transmitted and received between a transmission-side end device and a reception-side end device. The relay device stores packet information obtained by snooping on a first TCP packet that is addressed to the reception-side end device and received from the transmission-side end device and on a second TCP packet that is addressed to the transmission-side end device and received from another relay device that is arranged between the relay device and the reception-side end device on the path. The relay device performs, based on the packet information, first communication control between the relay device and the another relay device, where the first communication control is independent of second communication control that is performed between the transmission-side end device and the reception-side end device.

13 Claims, 9 Drawing Sheets

(56) References Cited

U.S. PATENT DOCUMENTS

2013/0176848 A1* 7/2013 Jinzaki ............... H04L 47/193
 370/230.1
2015/0127837 A1* 5/2015 Harashima ........... H04L 67/327
 709/227

OTHER PUBLICATIONS

Chiu et al., "A Fast Retransmission Technology for the 3GPP Long-Term Evolution," Taiwan-Japan Joint Conference on Communications Technology, 2007, pp. 41-45.

* cited by examiner

FIG. 4

| SRC IP | SRC PORT | DST IP | DST PORT | START SEQ NUMBER | END SEQ NUMBER | RELAY TIME | ACK FLAG |
|---|---|---|---|---|---|---|---|
| 133.160.10.5 | 9005 | 110.150.2.10 | 443 | 150 | 199 | 23:14:30:1598 | 1 |
| 133.160.10.5 | 9005 | 110.150.2.10 | 443 | 200 | 249 | 23:14:30:1599 | 1 |
| 133.160.10.5 | 9005 | 110.150.2.10 | 443 | 250 | 299 | 23:14:30:1600 | 1 |

39

APPARATUS AND METHOD FOR CONTROLLING TRANSMISSION BETWEEN RELAY DEVICES

CROSS-REFERENCE TO RELATED APPLICATION

This application is based upon and claims the benefit of priority of the prior Japanese Patent Application No. 2013-138917, filed on Jul. 2, 2013, the entire contents of which are incorporated herein by reference.

FIELD

The embodiment discussed herein is related to apparatus and method for controlling transmission between relay devices.

BACKGROUND

Various communication apparatuses perform Transmission Control Protocol (TCP) communication. For example, such communication apparatuses include a device called a wide area network (WAN) acceleration device or a WAN optimization device.

As clouds are used more widely, utility forms in which clients access servers running at cloud data centers increase. Such cloud data centers are typically located geographically far away or overseas. Thus, it often takes much round-trip time (RTT). The TCP communication using a line with much RU decreases in performance and communication throughput because of discarding of packets.

In recent years, it has been attempted to reduce the decrease in the average throughput in the TCP communication by using a device called a WAN acceleration device and replacing the TCP of an end device with a TCP with a higher line utilization rate.

The WAN acceleration device is arranged across a WAN line between a server and a terminal. The WAN acceleration device terminates a TCP session of the terminal or server on the transmission side once, replaces the TCP with a TCP that has been accelerated, hereinafter referred to as an accelerated TCP, and communicates with an opposed WAN acceleration device. The opposed WAN acceleration device causes the accelerated TCP to return to the usual TCP and communicates with the terminal or server on the reception side.

The algorithm of a high-speed transport protocol between WAN acceleration devices varies depending on a vendor. For example, a protocol to which a retransmission control function and a congestion control function are added as modification of a user datagram protocol (UDP) or a protocol obtained by enhancing an already-existing congestion control function of the TCP for greater efficiency is used.

For example, a UDP-based data transfer (UDT) protocol is known as a UDP-based protocol. Examples of the protocol obtained by modifying the TCP include an algorithm, such as CUBIC TCP or scalable TCP. In particular, the scalable TCP is a TCP congestion control algorithm obtained through modification for a WAN line with a large band and much RTT.

Meanwhile, a secure sockets layer virtual private network (SSL-VPN) is used in general so as to access a corporate intranet or a cloud from the Internet.

When an already-existing WAN acceleration device is applied to the environment using the SSL-VPN, however, communication may be impossible. One major reason is that a WAN acceleration device typically terminates a TCP session once. While the WAN acceleration device terminates the packet encapsulated in an SSL and the protocol is changed, the semantics may be broken and the decryption may be impossible at the reception terminal.

After terminating the TCP session, the WAN acceleration device uses a protocol other than the TCP, such as the UDP, and uses a different value even for a port number. Thus, when a firewall exists on the way, the packet may fail to pass through the firewall.

There is a method to address the possibilities described above, in which a WAN acceleration device acquires a certificate and cancels the encryption of the TCP session, which has been performed by an end device, and then terminates the TCP session and cancels the encryption once more so as to perform the encapsulation again for the communication through an SSL tunnel between the WAN acceleration devices. According to the method, it may be difficult to gain preferable throughput and costs may increase because the functions of the WAN acceleration device are complicated.

Examples of related art include Japanese Laid-open Patent Publication No. 11-46217 and non-patent literature, "Improving TCP/IP Performance over Wireless Networks[1]", Hari Balakrishnan, Srinivasan Seshan, Elan Amir and Randy H. Katz, {hari,ss,elan,randy}@CS.Berkeley.EDU, Computer Science Division, University of California at Berkeley.

SUMMARY

According to an aspect of the invention, a relay device is arranged on a path of a Transmission Control Protocol (TCP) packet that is transmitted and received between a transmission-side end device and a reception-side end device. The relay device stores packet information obtained by snooping on a first TCP packet that is addressed to the reception-side end device and received from the transmission-side end device and on a second TCP packet that is addressed to the transmission-side end device and received from another relay device that is arranged between the relay device and the reception-side end device on the path. The relay device performs, based on the packet information, first communication control between the relay device and the another relay device, where the first communication control is independent of second communication control that is performed between the transmission-side end device and the reception-side end device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data structure in an ACK list, according to an embodiment;

DESCRIPTION OF EMBODIMENT

Embodiments will be described below with reference to the drawings. The configurations in the embodiments described below are mere examples and the embodiments are not limited to the configurations described below.

In an embodiment, a relay device snoops on the contents of a packet in performing the packet relay in layer 2 (L2) or layer 3 (L3) without terminating a TCP session. When a packet loss is detected, retransmission is requested between the relay devices to perform local retransmission based on feedback independent of a retransmission mechanism of the TCP communication between the end devices. Accordingly, the discard rate in the TCP communication of the end devices may be lowered and decrease in the TCP communication throughput may be avoided (reduced).

[Network Configuration]

Figure 1:
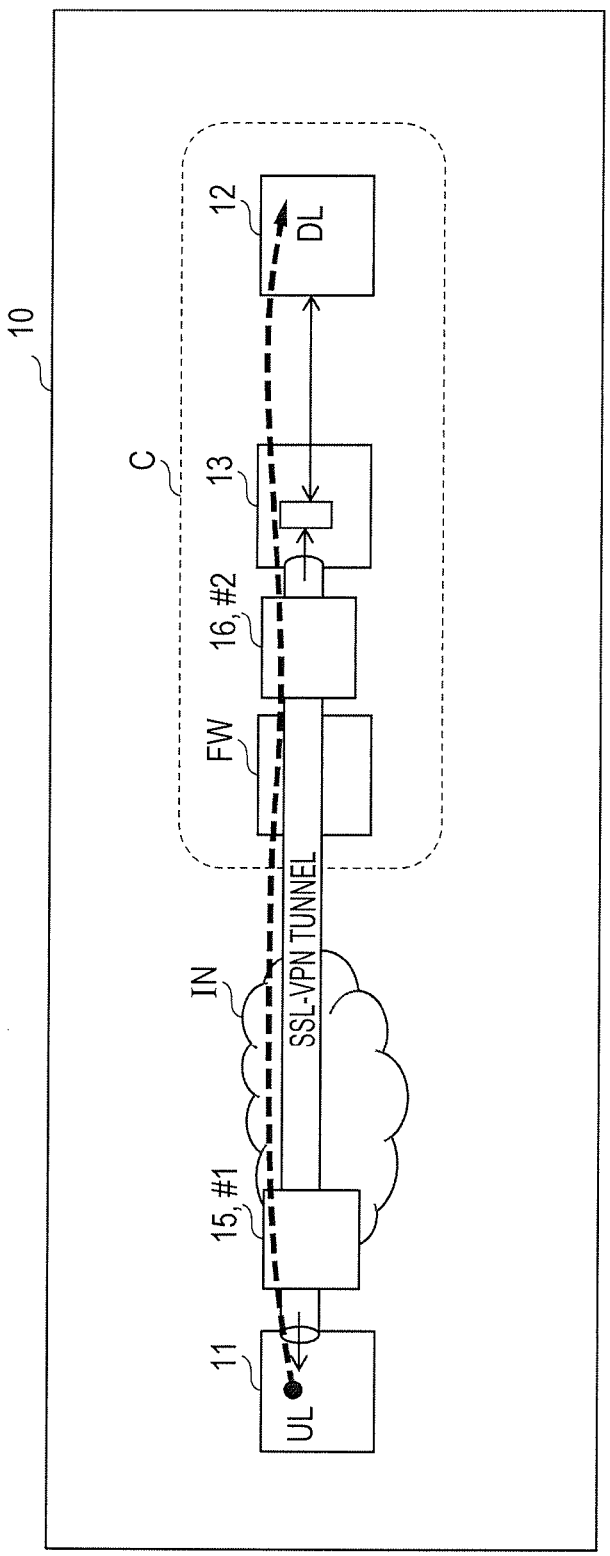
FIG. 1 is a diagram illustrating an example of a configuration of a network system, according to an embodiment.

FIG. 1 is a diagram illustrating an example of a configuration of a network system, according to an embodiment. In FIG. 1, the network system 10 includes Internet IN and a cloud C coupled to the Internet IN. The Internet IN is an example of Internet protocol (IP) nets. The cloud C may be an intranet.

A terminal (a terminal device) 11, which is a user terminal, is coupled to the Internet IN. The cloud C includes a terminal (a terminal device) 12 that communicates with the terminal 11, hereinafter referred to as the host 12, and includes an SSL-VPN device 13. A firewall FW is arranged at the entrance of the cloud C. An SSL communication session has settings that make it possible to pass through the firewall FW.

The network system 10 further includes relay devices according to the embodiment. That is, a relay device 15 (a relay device #1) is arranged in the Internet IN, and a relay device 16 (a relay device #2) is arranged between the firewall FW and the SSL-VPN device 13 in the cloud C. The relay device 15 is an example of a first relay device (a transmission-side relay device), and the relay device 16 is an example of a second relay device (a reception-side relay device).

The terminal 11 is an example of a transmission end device, and the SSL-VPN device 13 is an example of a reception end device. The relay device 15 is an example of the transmission-side relay device, and the relay device 16 is an example of the reception-side relay device.

When the terminal 11 performs the TCP communication with the host 12 in the cloud C, the communication is performed by using the SSL-VPN. The terminal 11 communicate with the host 12 by transmitting transmission data (a transmission packet), which is encrypted, through an SSL-VPN tunnel. That is, the terminal 11 encapsulates the transmission packet by giving headers based on the SSL-VPN to the transmission packet, and transmits the encapsulated packet. The encapsulated packet arrives at the cloud C via the relay device 15.

The encapsulated packet includes an SSL header and a TCP header, and a destination port number "443" is specified for the TCP header. Since the destination port number is specified, the encapsulated packet may pass through the firewall FW. The encapsulated packet is terminated at the SSL-VPN device 13 in the cloud C after passing through the relay device 16. That is, the original transmission packet is acquired by removing the header from the encapsulated packet. The SSL-VPN device 13 transfers the transmission packet to the host 12 by using a TCP session different from the TCP session of the SSL-VPN communication.

When a packet addressed to the terminal 11 is transmitted from the host 12, the SSL-VPN device 13 encapsulates the packet from the host 12. The encapsulated packet passes through the relay device 16, the firewall FW, the Internet IN, and the relay device 15, and is received at the terminal 11. The terminal 11 may acquire the original packet by removing the header from the encapsulated packet.

For example, when the cloud C, that is, a cloud data center, is located far away, such as overseas, and a session through the SSL-VPN tunnel (an SSL session) is set via the Internet IN, it is assumed that the SSL session passes through a line with a large delay (for example, with the RTT of 200 ms) and with a high discard rate (for example, with the discard rate of 0.1%).

In this case, it is expected that the SSL session between the terminal 11 and the SSL-VPN device 13 may fail to gain preferable throughput when a typical TCP protocol is used. The relay devices 15 and 16 are arranged in view of the circumstances described above. On the communication path between the relay device 15 and the relay device 16, one or more typical relay devices, which do not have a retransmission control function (will be described below) that the relay devices 15 and 16 have, may be arranged.

[Hardware Configuration Example of Relay Device]

For example, an already-existing hardware architecture that a layer 3 switch or a router has is applicable as the hardware configuration of each of the relay devices 15 and 16. An already-existing hardware architecture of a personal computer (PC), a workstation, or a special-purpose or general-purpose server machine is also applicable as the hardware configuration of the relay device.

Figure 2:
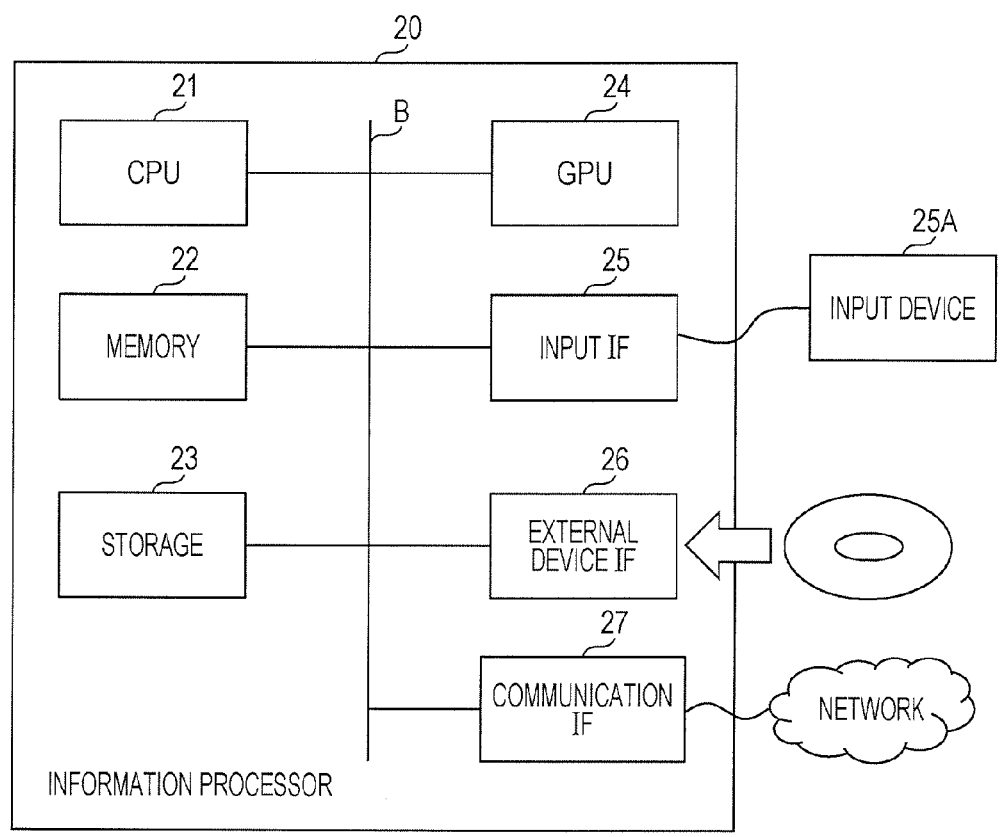
FIG. 2 is a diagram illustrating an example of a hardware configuration of an information processor (a computer) applicable to a relay device, according to an embodiment.

FIG. 2 is a diagram illustrating an example of a hardware configuration of an information processor (a computer) applicable to a relay device, according to an embodiment. In FIG. 2, for example, the information processor 20 includes a CPU 21, memory 22, a storage (a storage device) 23, and a graphics processing unit (GPU) 24. The information processor 20 further includes an input interface (IF) 25, an external device IF 26, and a communication IF 27.

The CPU 21, the memory 22, the storage 23, the GPU 24, the input IF 25, the external device IF 26, and the communication IF 27 are coupled to one another through a bus B.

An input device 25A, such as a keyboard, a button, or a pointing device, is coupled to the input IF 25. The external device IF 26 includes a universal serial bus (USB) port to which, for example, a drive of a disc recording medium, such as a compact disc (CD), a digital versatile disc (DVD), or a Blu-ray Disc (BD), USB memory, or a peripheral device, such as an output device like a display, is coupled.

The memory 22 functions as main memory used as a work area of the CPU 21. For example, the main memory includes random access memory (RAM) and read-only memory (ROM).

The storage 23 stores various programs executed by the CPU 21 and data used when each program is executed. For example, the storage 23 is a non-volatile recording medium and may be made up of at least one of a hard disk, flash memory, and electrically erasable programmable read-only memory (EEPROM). Each of the memory 22 and the storage 23 is an example of the recording medium. The GPU 24 is a processor in charge of image processing.

The communication IF 27 includes a communication IF circuit. For example, an already-existing network card or an IF device for local area network (LAN) connection, which is called a network interface card (NIC), is applicable to the communication IF 27. The communication IF 27 is coupled to, for example, the Internet IN or a network in the cloud C.

The CPU 21 may function as the relay device 15 or 16 by, for example, loading a program installed in the storage 23 into the memory 22 and executing the program. The CPU 21 is an example of a processor (a microprocessor) or a control device. A digital signal processor (DSP) may be used instead of the CPU 21.

The hardware configuration of the information processor 20 illustrated in FIG. 2 is applicable as the hardware configuration of the terminal 11, the host 12, or the SSL-VPN device 13 illustrated in FIG. 1. The below-described functions that the relay device 15 or 16 has are applicable to end devices including a terminal device, such as the terminal 11 or the host 12, and a server, or to various relay devices including a WAN acceleration device.

The functions implemented by executing programs using the CPU 21, the memory 22, and the storage 23 described above may be implemented in accordance with hardware logic (wired logic) using a special-purpose or general-purpose hardware chip.

The functions implemented in accordance with the hardware logic (the wired logic) may be implemented by, for example, at least one, or two or more of an electric circuit, an electronic circuit, an integrated circuit (IC), such as large scale integration (LSI) or an application-specific integrated circuit (ASIC), and a programmable logic device (PLD), such as a field programmable gate array (FPGA).

[Configuration Example of Relay Device]

Figure 3:
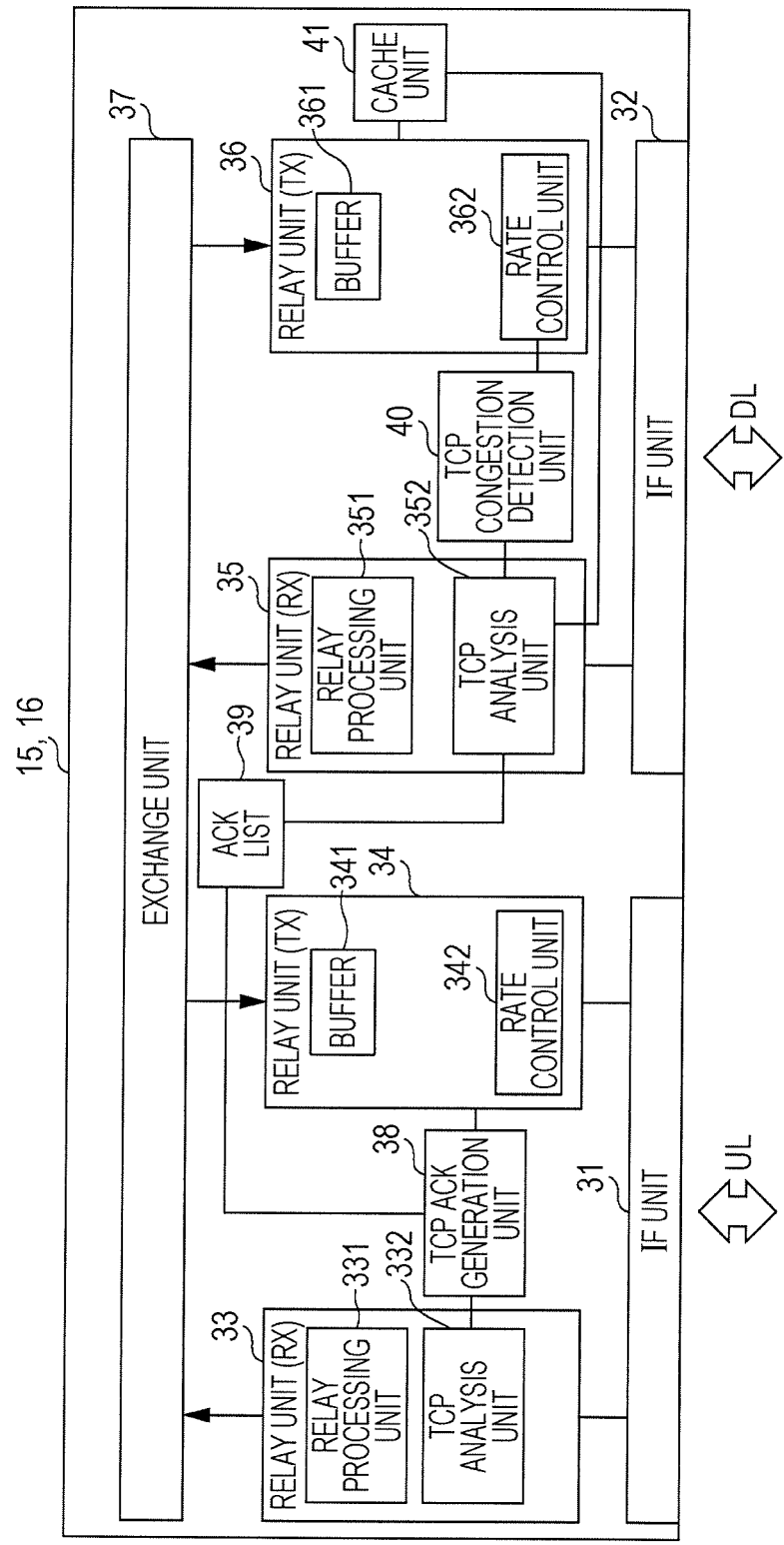
FIG. 3 is a diagram illustrating an example of a configuration of a relay device, according to an embodiment.

FIG. 3 is a diagram illustrating an example of a configuration of a relay device, according to an embodiment. Since the configurations of the relay devices 15 and 16 are substantially the same, FIG. 3 illustrates the configuration of the relay device 15 as an example. The relay device 15 includes an IF unit 31 for an uplink (UL) and an IF unit 32 for a downlink (DL).

The IF unit 31 is coupled to a relay unit (RX) 33 on the reception side and a relay unit (TX) 34 on the transmission side. The IF unit 32 is coupled to a relay unit (RX) 35 on the reception side and a relay unit (TX) 36 on the transmission side. The relay units 33, 34, 35, and 36 are coupled to an exchange unit (a switch) 37.

On the UL side, the relay unit 33 includes a relay processing unit 331 and a TCP analysis unit 332, and the relay unit 34 includes a buffer 341 and a rate control unit 342. The TCP analysis unit 332 is coupled to a TCP ACK generation unit 38, and the TCP ACK generation unit 38 is coupled to an ACK list 39.

On the DL side, the relay unit 35 includes a relay processing unit 351 and a TCP analysis unit 352. The relay unit 36 includes a buffer 361 and a rate control unit 362. The ACK list 39 is coupled to the TCP analysis unit 352. The TCP analysis unit 352 is coupled to a TCP congestion detection unit 40. The TCP congestion detection unit 40 is coupled to the rate control unit 362. The relay unit 36 is coupled to a cache unit 41.

Each of the IF units 31 and 32 converts signals from a network into packets that the relay units may handle or converts packets transmitted from the relay units into signals suitable for the network. The exchange unit 37 transfers a packet received from the relay unit on the reception side (the relay unit 33 or 35) to the relay unit on the transmission side (the relay unit 34 or 36) corresponding to an output IF specified by the relay unit on the reception side, that is, the exchange unit 37 performs switching.

Each of the relay units 33 to 36 transfers a packet received from the corresponding IF unit (one of the IF units 31 and 32) to the other IF unit (the other one of the IF units 31 and 32) in accordance with relay rules, such as a path table (a routing table) held in advance. The relay may be relay of layer 2 or layer 3 in an open systems interconnection (OSI) reference model.

Each of the relay processing units 331 and 351 determines a transfer-destination IF unit of the packet received from the corresponding IF unit in accordance with the relay rules. Each of the TCP analysis units 332 and 352 snoops on (performs snooping) and checks information of the TCP header included in the packet received at the corresponding relay unit 33 or 35 on the reception side.

Each of the buffers 341 and 361 temporarily accumulates untransmitted packets transferred from the exchange unit 37. Each of the rate control units 342 and 362 controls a packet transmission rate. For example, the rate control unit 362 regulates the packet transmission rate in the relay unit 36 based on instructions from the TCP congestion detection unit 40.

When it is found as a result of the TCP analysis unit 332 snooping on (checking) the packet received from a communication device on the UL (upstream) side that a TCP packet is included, the TCP ACK generation unit 38 generates a TCP acknowledgment message, also referred to as a TCP ACK, on behalf of an end device (an end host) on the DL (downstream) side. The packet including the TCP ACK, also referred to as the ACK packet, is transmitted to the communication device on the UL side via the relay unit 34 and the IF unit 31. Accordingly, decrease in the transfer throughput between a transmission host (an end device on the UL side) and the relay device 15 may be suppressed.

The TCP congestion detection unit 40 determines the degree of congestion in a line between communication devices based on the results of the TCP analysis unit 352 snooping on the ACK packet received from the communication device on the DL side. Based on the results of the determination, the TCP congestion detection unit 40 provides the rate control unit 362 on the DL side with instructions on a transmission bandwidth.

Further, the TCP congestion detection unit 40 determines the transmission rate of the relay device positioned on the UL side, based on the communication quality of the network between the relay device positioned on the UL side and the relay device positioned on the DL side, which is determined based on the ACK packet that is transmitted by the communication device on the DL side.

The cache unit 41 accumulates packets relayed by the relay unit 36 on the transmission side in preparation for a retransmission request. The packets accumulated in the cache unit 41 are removed from the cache unit 41 when the TCP analysis unit 352 detects a corresponding ACK.

The ACK list 39 is a list that records identification information of a packet (a message) for which an ACK is returned locally in the relay device and information indicating whether or not the ACK has been transmitted. When the analysis unit 352 on the DL side receives an ACK from the DL side, the analysis unit 352 refers to the ACK list 39 and determines whether to transfer the received ACK to the UL side or not.

FIG. 4 is a diagram illustrating an example of a data structure in an ACK list, according to an embodiment. In FIG. 4, the ACK list 39 is made up of one or more records. As the identification information on a packet, a record to be stored includes a transmission-source IP address (SRC IP), a transmission-source port number (SRC PORT), a destination IP address (DST IP), a destination port number (DST PORT), a start sequence (SEQ) number, an end SEQ number, and relay time. The record to be stored further includes an ACK flag as the information indicating whether or not an ACK has been transmitted. The ACK flag is set (at ON) when the relay unit 34 on the UL side finishes transmitting an ACK, and is not set before the ACK transmission is not finished.

The functions of the IF units 31 and 32 illustrated in FIG. 3 may be implemented by the communication IF 27 illustrated in FIG. 2. For example, the functions of the relay processing units 331 and 351, the TCP analysis units 332 and 352, the TCP ACK generation unit 38, the TCP congestion detection unit 40, and the rate control units 342 and 362 may be implemented by the CPU 21 executing programs. The functions of the buffers 341 and 361, and the cache unit 41 may be implemented using a storage area of the memory 22. The ACK list 39 is stored in the storage area of the memory 22. The functions of the relay processing units 331 and 351, and the exchange unit 37 may be implemented by the CPU 21 executing programs, or using special-purpose or general-purpose hardware.

The configuration of the relay device illustrated in FIG. 3 may be employed in a terminal or a server. In this case, for example, a virtual machine is configured on the terminal or the server, and functions similar to the functions of the relay device are performed by software on the virtual machine. In the hardware configurations of the relay devices 15 and 16, the GPU 24, the input IF 25, and the external device IF 26 may be omitted.

[Sequence of Operations]

Figure 5:
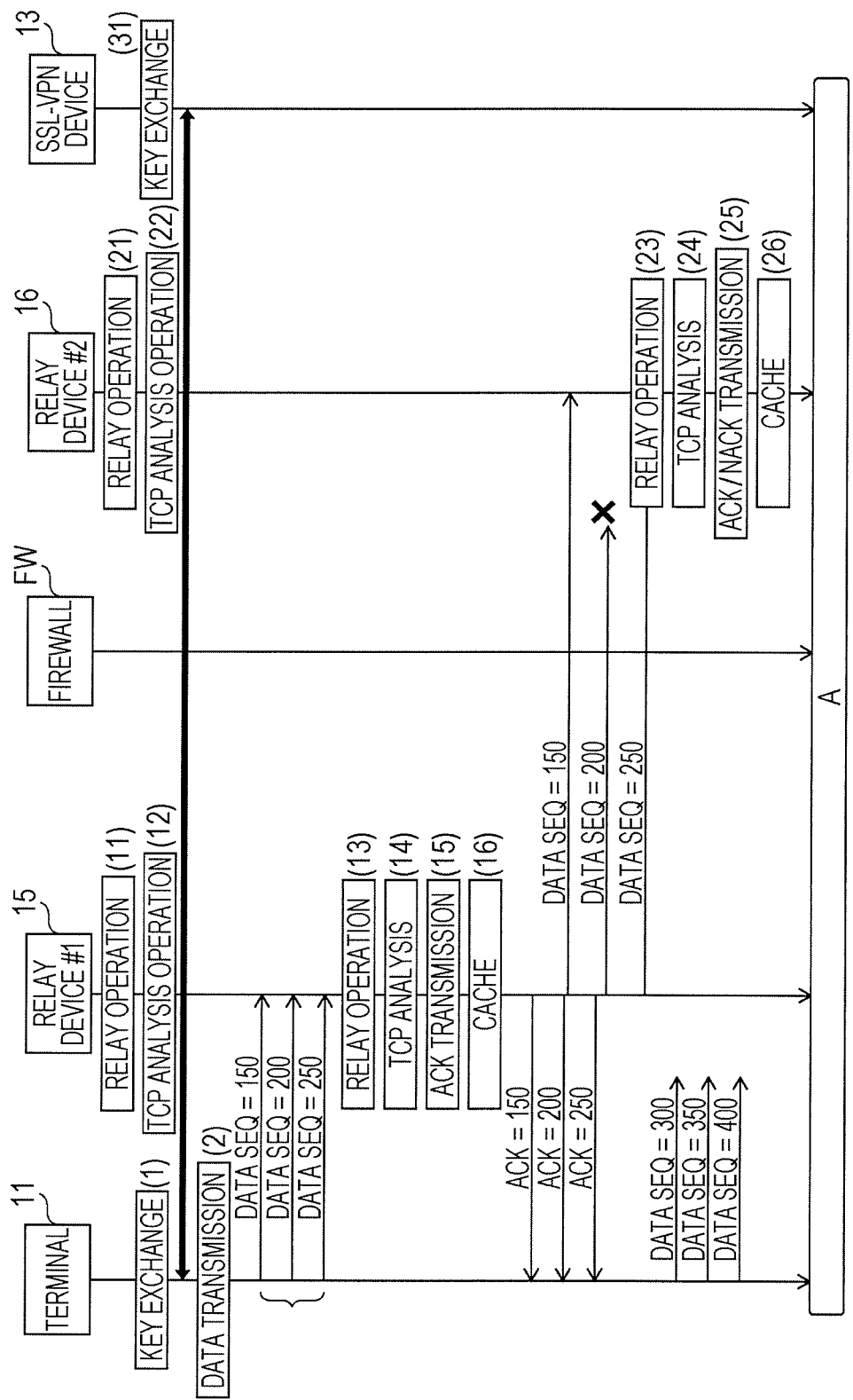
FIGS. 5 and 6 are diagrams illustrating an operational sequence of a relay device in a case in which a terminal and a host illustrated in FIG. 1 perform a TCP communication, according to an embodiment.
Figure 6:
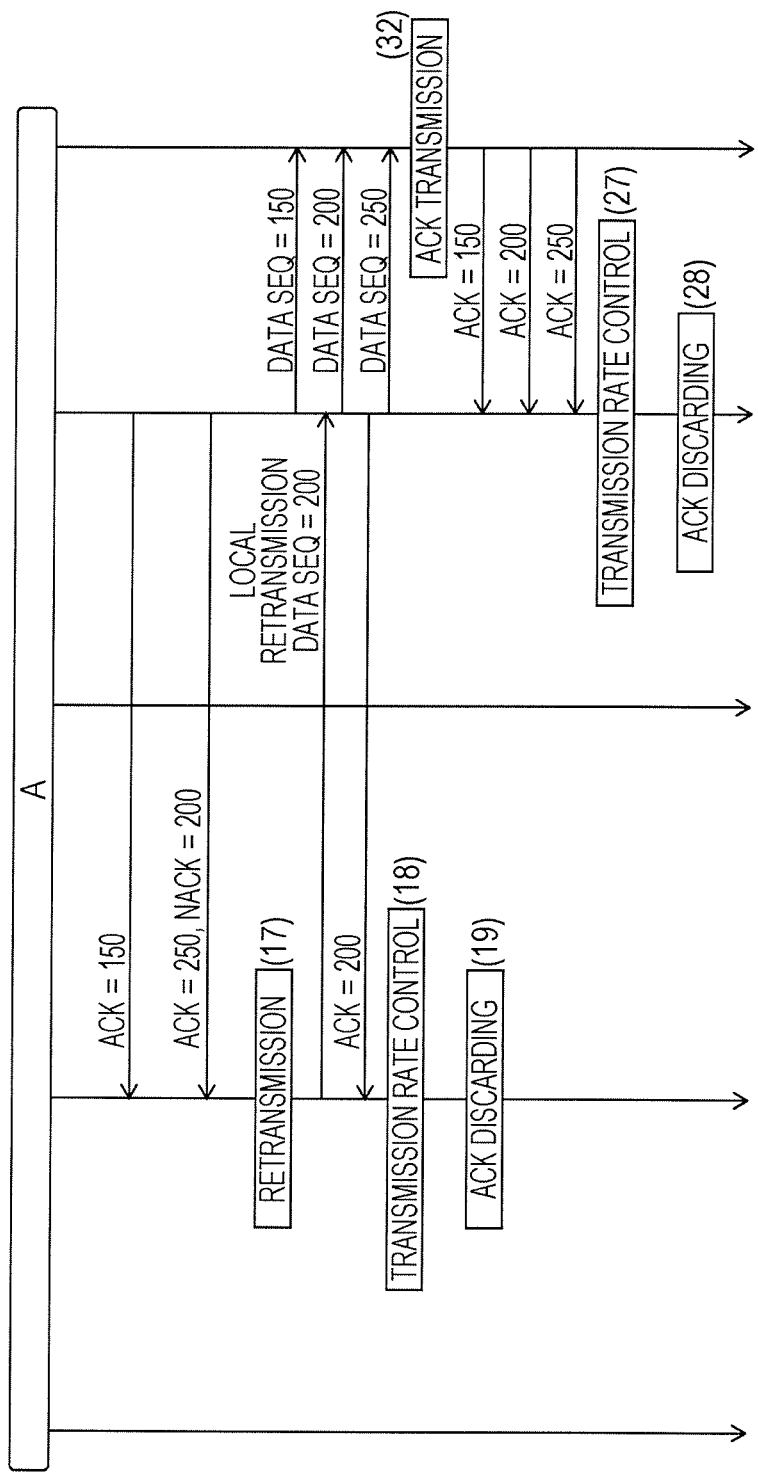

FIGS. 5 and 6 are diagrams illustrating an operational sequence of a relay device in a case in which a terminal and a host illustrated in FIG. 1 perform a TCP communication, according to an embodiment. In the sequence illustrated in FIG. 5, it is assumed that an SSL session is established between the terminal 11 and the SSL-VPN device 13 in the cloud C, and a file (data) is transferred from the terminal 11 to the host 12 located on the downstream side of the SSL-VPN device 13. When viewed from the relay devices 15 and 16, the side of the terminal 11 corresponds to the UL side and the side of the host 12 corresponds to the DL side.

The terminal 11 establishes an SSL session between the terminal 11 and the SSL-VPN device 13, for which the TCP port number "443" is specified as the destination port number. The firewall FW allows the SSL session to pass.

The terminal 11 requests a key from the SSL-VPN device 13 (1), and exchanges common keys with the SSL-VPN device 13 (31). At this time, each of the relay devices 15 and 16 refers to the contents of a TCP packet for establishing the SSL session (11 and 21), and when the TCP packet is a packet for the key exchange, continues the relay operation (12 and 22).

For example, when the relay devices 15 and 16 refer to a value of "Content Type" of an SSL header, which is included in the TCP packet, and the value matches "Application-_Data" indicating that user data is included, ACK generation and transmission operations may be performed.

When the terminal 11 exchanges the common keys with the SSL-VPN device 13, the terminal 11 encrypts data and transmits the encrypted data using the TCP session (2). According to the TCP, window control is performed during the communication. It is assumed here that IP packets, hereinafter also referred to as encapsulated packets or mere "packets", including TCP segments with SEQ numbers of 150 to 250 ("SEQ=150" to "SEQ=250"), are transmitted.

In the relay device 15 (the relay device #1), the relay processing unit 331 of the relay unit 33 on the UL side performs a relay operation for packets without terminating the TCP communication (13). At this time, the TCP analysis unit 332 refers to (snoops on) a TCP header of the packet (14). When the TCP header is present, the TCP ACK generation unit 38 generates an ACK for the packet. The ACK is transmitted to the terminal 11 (15). At this time, information on the packet for which the ACK has been transmitted is stored in the ACK list 39. At this time, in the ACK list 39, the ACK flag in the record of the packet is set at ON. In such a manner, an ACK is transmitted to the terminal 11 before being received from an opposed device (the relay device 16). Accordingly, the ACK waiting state of the terminal 11 may be canceled early.

The relay unit 36 on the DL side causes the packet received from the relay unit 33 via the exchange unit 37 to be temporarily stored in the cache unit 41 in preparation for retransmission between the relay device 15 and the relay device 16 (16). The packet is sent out from the relay unit 36 to the Internet IN via the IF unit 32 (see FIG. 1). When the communication is performed normally, the packet arrives at the relay device 16 through the firewall FW of the cloud C. FIG. 5, however, illustrates a case in which the packet including the SEQ number "200" ("SEQ=200") is discarded in the network between the relay device 15 and the relay device 16.

In the relay device 16, the relay processing unit 331 of the relay unit 33 performs a relay operation for the received packets (23). At this time, the TCP analysis unit 332 refers to the TCP headers of the packets (24) and may detect that the packet of "SEQ=200" is absent (discarded) from the packets to be relayed.

Based on the results of the analysis of the TCP analysis unit 332, the TCP ACK generation unit 38 generates a local ACK, which is a positive response indicating success in reception, or a NACK (a non-ACK), which is a negative response indicating failure of reception. That is, the TCP ACK generation unit 38 generates a packet including an ACK for the packet that the relay unit 33 has successfully received, and generates a packet including a NACK for the packet that the relay unit 33 has failed to receive (25). The generated packets including the ACKs and the NACKs (the ACK/NACK packets) are transmitted to the relay device 15. The packet including an ACK or a NACK, which may also referred to as an ACK/NACK message, includes no user data and is undesired to be encrypted.

In the relay device 16, the relay unit 36 on the transmission side transfers a packet to the SSL-VPN device 13 and caches the relayed packet by accumulating a copy of the packet in the cache unit 41 (26).

The relay device 15 receives a local ACK or NACK from the relay device 16. When a local ACK is received, the TCP analysis unit 352 of the relay unit 35 detects the local ACK.

In this case, the TCP analysis unit 40 deletes the packet corresponding to the local ACK stored in the cache unit 41. When the TCP analysis unit 40 detects a local NACK, the relay unit 36 acquires the packet corresponding to the local NACK from the cache unit 41 and retransmits the packet to the relay device 16 (17).

The local ACK or local NACK transmitted from the relay device 16 in operation 25 is a message generated so as to perform local retransmission of a packet between the relay device 15 and the relay device 16. Thus, the relay device 15 does not relay the local ACKs or local NACKs in the UL direction.

For example, in the relay device 15, when the relay unit 35 on the DL side receives a local ACK, the ACK list 39 is referred to, and when the relay unit 34 on the UL side has already transmitted an ACK to the communication apparatus on the upstream side (the terminal 11), that is, the ACK flag is being set at ON, the local ACK packet is discarded (19).

Further, in the relay device 15, the TCP congestion detection unit 40 coupled to the TCP analysis unit 352 monitors the arrival of a local ACK or a local NACK from the relay device 16. The TCP congestion detection unit 40 detects the degree of congestion in a line between the relay device 15 and the relay device 16. Depending on the detected degree of the congestion, the rate control unit 362 decides the packet transmission rate in the DL direction (18).

For example, the TCP congestion detection unit 40 measures the arrival times (the RTT) of the local ACK packets for the packets transmitted from the relay device 15 to the relay device 16. When fluctuations in the arrival interval are small in the results of the measurement, it is determined that there is room for raising the transmission rate in the line between the relay device 15 and the relay device 16, and the transmission rate is raised. In contrast, when the fluctuations are large, the TCP congestion detection unit 40 determines that congestion is occurring between the relay device 15 and the relay device 16, and lowers the transmission rate.

The relation between the fluctuations (distribution) and the transmission rate is now described. The TCP congestion detection unit 40 calculates a fluctuation diff of the RTT between a packet transmitted to the relay device 16 and the local ACK packet for the packet. The TCP congestion detection unit 40 increases the transmission interval of packets (the inter-packet gap) based on how large the fluctuations are.

The fluctuation diff of the RTT may be calculated using expression (1) below.

$$\mathit{diff}(\text{fluctuation}) = \left(\frac{\text{win}}{\text{baseRTT}} - \frac{\text{win}}{\text{RTT}}\right)\text{baseRTT} \quad (1)$$

In the expression (1), base RTT represents a minimum value of RTTs measured in the relay device, and win represents a window size. When E(diff) represents the average of the fluctuations diff and V(diff) represents the distribution of the fluctuations cliff, V(diff) may be determined using expression (2) below, and when V(diff) is equal to or more than a certain threshold value γ, a transmission rate W may be determined using expression (3) below.

$$V(\mathit{diff}) = E(\mathit{diff}^2) - (E(\mathit{diff}))^2 \quad (2)$$

$$W(\text{rate}) = \begin{cases} P & \ldots V(\mathit{diff}) < \gamma \\ \dfrac{L \times 8 \times P}{L \times 8 \times (g - g_0)P} & \ldots V(\mathit{diff}) \geq \gamma \end{cases} \quad (3)$$

Figure 7:
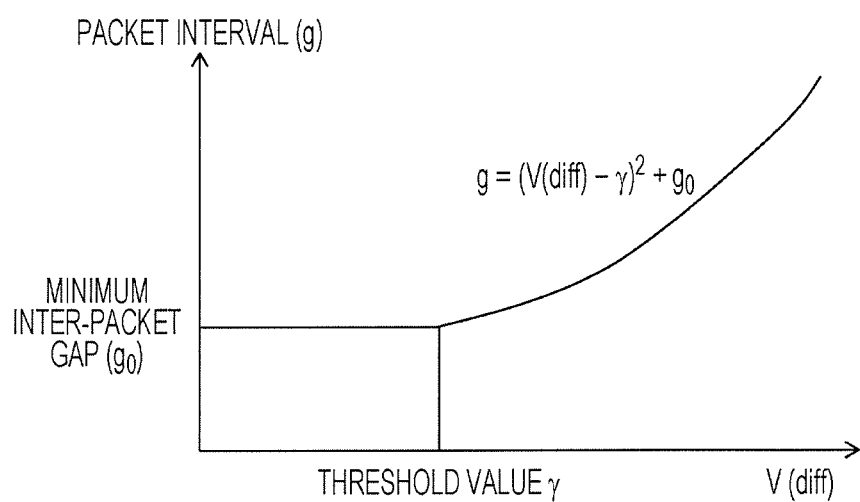
FIG. 7 is a diagram illustrating an example of a graph indicating the relation between the distribution V(diff) of the fluctuations diff and a packet interval (g), according to an embodiment.

FIG. 7 is a diagram illustrating an example of a graph indicating the relation between the distribution V(diff) of the fluctuations diff and a packet interval (g), according to an embodiment. While the distribution V(diff) is less than the threshold value γ, packets are transmitted with a minimum inter-packet gap ($g_0$). That is, packets are transmitted at a maximum transmission rate. In contrast, when the distribution V(diff) exceeds the threshold value γ, the packet interval (g) is widened as the distribution V(diff) increases (see the curvilinear part of the graph illustrated in FIG. 7). Thus, when the fluctuation increases, a packet loss (discarding) may be avoided by lowering the transmission rate W.

Employing the transmission rate control described above enables packets to be transmitted under rate control different from the TCP-based rate control (the window control) performed by the terminal 11. As a result, it may be avoided even in a line with large RTT to be affected by the throughput resulting from the rate control in the terminal 11.

Referring back to FIG. 6, the relay device 16 relays (transmits) the packets received from the relay device 15 to the SSL-VPN device 13. At this time, the relayed (transmitted) packets are temporarily stored (cached) in the cache unit 41.

The SSL-VPN device 13 transmits an ACK for the received packet (32). In the relay device 16, when an ACK is received at the relay unit 35 on the DL side, the TCP analysis unit 352 refers to the ACK list 39, and when the relay unit 33 on the UL side has already transmitted a local ACK to the communication apparatus on the upstream side (the relay device 15), the ACK packet is discarded (28). In contrast, when no local ACK has been transmitted (the ACK flag is being set at OFF), the relay unit 36 transmits a local ACK to the relay device 15.

The SSL-VPN device 13 terminates the SSL session for the packet received from the relay device 16. That is, the SSL-VPN device 13 decapsulates the packet and acquires the original packet. The original packet is transmitted to the host 12 using another TCP session established between the SSL-VPN device 13 and the host 12. The host 12 returns an ACK for the packet that the host 12 has successfully received and a NACK for the packet that the host 12 has failed to receive to the SSL-VPN device 13.

[Process Flowchart]

Figure 8:
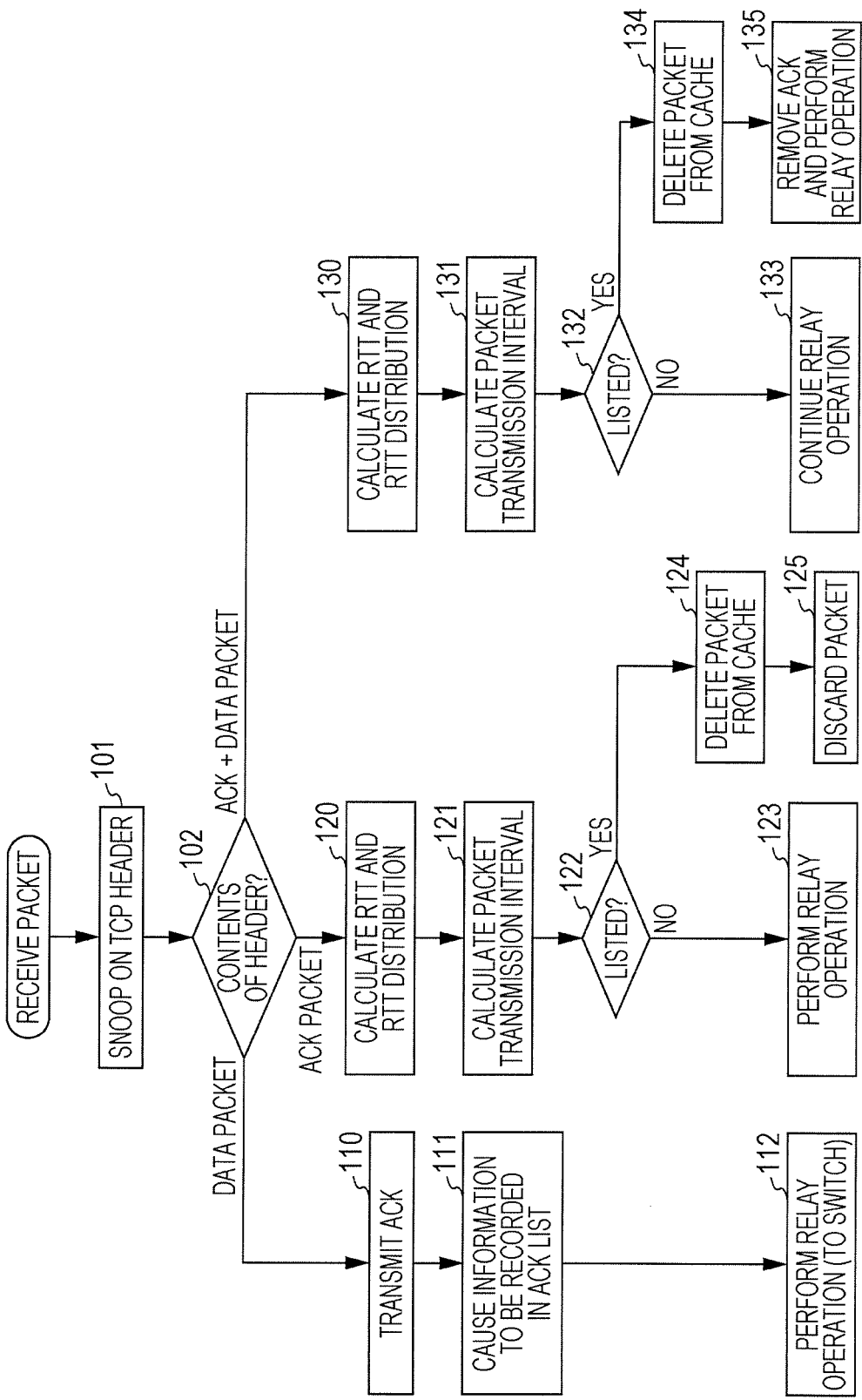
FIG. 8 is a diagram illustrating an example of an operational flowchart for a process of a CPU, which is performed in a relay device at the time of packet reception, according to an embodiment.

FIG. 8 is a diagram illustrating an example of an operational flowchart for a process of the CPU 21, which is performed in the relay device 15 (the relay device 16) at the time of packet reception, according to an embodiment. When a packet is received, the CPU 21 that functions as the relay processing unit 331 on the reception side, upon receiving a packet, functions as the TCP analysis unit 332 and snoops on the TCP header of the packet (101).

After that, the CPU 21 refers to the stored contents of the TCP header and determines the type of the packet (the TCP packet) (102). The TCP packet may be classified as a typical data packet that includes user data, as an ACK packet that includes an ACK but includes no user data, or as an "ACK+data" packet that includes user data and an ACK.

When the TCP packet is a data packet, the process proceeds to operation 110. In operation 110, the CPU 21 functions as the TCP ACK generation unit 38, generates an ACK for the data packet, and transmits the ACK to the communication apparatus on the UL side. Operation 110 is performed mainly when the relay device 15 receives a data packet from the terminal 11 and relays the data packet to the relay device 16.

At this time, the CPU 21 causes the sequence number of a last segment that has been normally received to be included in the ACK. Further, as regards lost segments which are detected by observing the skips of the sequence number, the CPU 21 may use a selective acknowledgment (SACK) field, which is one of option fields of the TCP header, and notify the communication apparatus on the upstream side of the lacking sequence number.

Further, the CPU 21 functions as the TCP ACK generation unit 38, causes identification information on the data packet for which an ACK has been transmitted to be recorded in the ACK list 39 (see FIG. 4), and sets the ACK flag at ON (111).

After that, the CPU 21 functions as the relay processing unit 331, refers to the IP header of the packet, refers to the path table (the routing table, not illustrated) stored in advance in the memory 22 or the storage 23, not illustrated, and determines a transmission-destination IF corresponding to the destination IP address. Then, the CPU 21 controls the exchange unit (the switch) 37 so that the packet is transferred to the decided IF (112). The exchange unit (the switch) 37 transfers the packet to the IF unit 32 on the transmission side (the DL side) and the packet is temporarily stored in the buffer 361.

When it is determined in operation 102 that the TCP packet is an ACK packet, the process proceeds to operation 120. Operation 120 and operations after 120 are performed mainly when the relay device 15 receives a local ACK packet for the data packet that the relay device 16 has received from the relay device 15.

In operation 120, when the TCP packet is a local ACK packet, the CPU 21 functions as the TCP congestion detection unit 40. That is, the CPU 21 determines the RTT based on the reception time of the local ACK and the relay time of the data packet corresponding to the local ACK, which is recorded in the ACK list 39. After that, the CPU 21 calculates the average value of the RTT, which is represented by E(diff), and calculates the distribution of the RTT of consecutive packets, which is represented by V(diff).

The CPU 21 determines the congestion state using the average and distribution of the RTT, and determines the transmission interval (the transmission rate) of the packet (121). Further, the CPU 21 refers to the ACK list 39(122), and when the ACK flag of the record corresponding to the local ACK is ON, deletes the data packet from the cache unit 41 (124), and discards the local ACK packet (125) because the ACK packet is no more desired to be notified in the UL direction. At this time, the corresponding record is also deleted from the list.

When the ACK of the data packet corresponding to the local ACK is not yet transmitted in the UL direction (the ACK flag is being set at OFF), the CPU 21 relays the ACK packet in the UL direction (123) because it is implied that the relay device on the UL side (the relay device 15) has not transmitted any ACK to the terminal 11 yet.

When it is determined in operation 102 that the TCP packet is an "ACK+data" packet, operation 130 and operations after 130 are performed. Operation 130 and operations after 130 are performed mainly when the data packets that the relay device 16 receives from the relay device 15 are relayed without transmission of respective local. ACK packets for the data packets as in, for example, the key exchange operation, and when the "ACK+data" packet that includes user data and an ACK as one packet and has been transmitted from the host 12 to the terminal 11 is received on the DL side.

Operations 130 to 132, and 134 are the same as operations 120 to 122, and 124. In operation 135, the CPU 21 generates a data packet, which is obtained by removing the ACK from the "ACK+data" packet, and the generated data packet is transferred to the UL side. In operation 133, since the ACK flag is being set at OFF, the CPU 21 transfers the "ACK+data" packet to the UL side without making any changes to the "ACK+data" packet.

Figure 9:
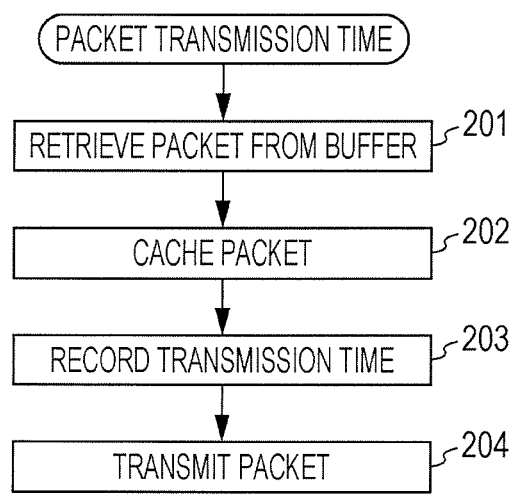
FIG. 9 is a diagram illustrating an example of an operational flowchart for a process of a CPU, which is performed when the CPU functions as a relay unit on the transmission side, according to an embodiment.

FIG. 9 is a diagram illustrating an example of an operational flowchart for a process of the CPU 21, which is performed when the CPU 21 functions as the relay unit 36 on the transmission side, according to an embodiment. The CPU 21 transmits packets at the packet transmission intervals set in operation 121 or 131 in FIG. 8. That is, the CPU 21 retrieves one packet from the buffer 361 at the packet transmission time (201). After that, the CPU 21 writes a copy of the packet into the cache unit 41 (202). Subsequently, the CPU 21 causes the packet transmission time to be recorded in the ACK list 39 (203), and transfers the packet to the IF unit 32 (204).

In the description using FIGS. 3 to 9, the configurations and operations for the case in which a TCP packet is transmitted from the UL side in the DL direction are explained. The relay devices 15 and 16 may include another element so as to perform operations similar to the above for a TCP packet of the SSL session, which is transferred from the DL side in the UL direction (from the SSL-VPN device 13 to the terminal 11).

Advantages of Embodiment

According to the network system 10 of the embodiment, TCP packet retransmission control independent of the retransmission control performed between the terminal 11 and the SSL-VPN device 13 (the end devices) is performed between the relay devices 15 and 16 arranged between the terminal 11 and the SSL-VPN device 13.

In the independent retransmission control, the retransmission of a TCP packet is not requested from the terminal 11, which is the transmission-source device of the TCP packet, but a copy of the TCP packet cached (temporarily stored) in the relay device 15 or 16 is used. Accordingly, time taken for the retransmission may be reduced, thereby suppressing decrease in the throughput of the TCP packet between the end devices.

The independent retransmission control is performed by the relay devices 15 and 16 snooping on the TCP header of the TCP packet. That is, the encryption of the TCP session is not canceled between the end devices once. Thus, the TCP session is not blocked by the firewall FW, and the decrease in the throughput, which is caused by a complicated operation for temporarily canceling the TCP session, may be suppressed. In addition, it may be undesired to prepare an expensive device, such as an already-existing WAN acceleration device.

The relay device 15 calculates the RTT based on the transmission time of the TCP packet and the reception time of the ACK packet corresponding to the TCP packet, and further calculates the average and distribution of the RTT (the average and distribution of the fluctuations). The relay device 15 uses the value of the distribution as an indicator of the degree of the congestion between the relay devices, and determines the packet transmission interval (the transmission rate) suitable for the distribution value. Similar to the relay device 15, the relay device 16 may also determine the transmission rate. Thus, the relay devices 15 and 16 may perform the transmission rate control different from the transmission rate control performed between the end devices.

Including the retransmission control and the rate control described above, communication control independent of the communication control performed between the end devices may be performed between the relay devices of the embodiment. For example, each of the congestion detection, the error correction control, and the transmission rate control may be performed between the relay devices in a manner different from the manner employed between the end devices.

For example, when the congestion detection is performed between the end devices based on the detection of a packet loss, the congestion detection based on queuing delay detection may be performed between the relay devices. When the congestion detection is performed between the end devices based on the queuing delay detection, congestion detection based on the measurement of a vacant bandwidth may be performed between the relay devices.

While the retransmission of a packet is performed between the end devices at the time of the detection of congestion as the error correction control, an operation of adding redundant data to a packet, which is based on forward error correction (FEC), may be performed between the relay devices at the time of the detection of congestion as the error correction control. Retransmission backoff control different from the retransmission backoff control performed between the end devices may also be performed between the relay devices. A retransmission timer value different from the retransmission timer value used between the end devices may also be used between the relay devices.

When a method of increasing or decreasing the size of a congestion window is used between the end devices as the rate control, a method of adjusting the inter-packet gap, which is described with reference to FIG. 7, or a method of controlling the maximum transmission rate instead of the window size may be performed between the relay devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A relay device arranged on a path of a Transmission Control Protocol (TCP) packet transmitted and received between a transmission-side end device and a reception-side end device, the relay device comprising:
   a memory configured to store packet information obtained by snooping on a first TCP packet that is addressed to the reception-side end device and received from the transmission-side end device and on a second TCP packet that is addressed to the transmission-side end device and received from another relay device that is arranged between the relay device and the reception-side end device on the path; and
   a processor configured to perform, based on the packet information, first communication control between the relay device and the another relay device, the first communication control being independent of second communication control that is performed between the transmission-side end device and the reception-side end device;
   wherein the processor determines, based on the packet information obtained by snooping the first and second TCP packets, at least one of a transmission rate and congestion detection.

2. The relay device of claim 1, wherein
when the first TCP packet received from the transmission-side end device is relayed to the another relay device, the memory stores a copy of the first TCP packet; and
when it is found as a result of snooping on the second TCP packet received from the another relay device that the second TCP packet includes a negative response regarding reception of the first TCP packet relayed to the another relay device, the processor performs retransmission of the first TCP packet using the copy of the first TCP packet stored in the memory.

3. The relay device of claim 2, wherein
the memory stores control information indicating whether or not a positive response regarding reception of the first TCP packet relayed to the another relay device has been transmitted to a transmission source of the first TCP packet, and
when it is found as a result of snooping on the second TCP packet received from the another relay device that the second TCP packet that has undergone the snooping includes the positive response regarding reception of the first TCP packet relayed to the another relay device, the processor discards or transfers the second TCP packet that includes the positive response, based on the control information stored in the memory.

4. The relay device of claim 3, wherein
upon receiving the first TCP packet from the transmission-side end device before receiving the positive response of the first TCP packet from the another relay device, the processor generates the positive response and transmits the generated positive response to the transmission-side end device, and causes the memory to store the control information indicating that the positive response has been transmitted to the transmission-side end device.

5. The relay device of claim 4, wherein
when session information included in the first TCP packet indicates predetermined session information, the processor generates the positive response and transmits the generated positive response to the transmission-side end device.

6. The relay device of claim 4, wherein
when a content type included in the first TCP packet indicates a predetermined type, the processor generates the positive response and transmits the generated positive response to the transmission-side end device.

7. The relay device of claim 1, wherein
based on the packet information obtained by snooping the first and second TCP packets, the processor performs the congestion detection in a first manner different from a second manner of congestion detection that is performed between the transmission-side end device and the reception-side end device.

8. The relay device of claim 1, wherein
the processor determines, based on the packet information obtained by snooping the first and second TCP packets, the transmission rate in a first manner different from a second manner in which the transmission rate is determined between the transmission-side end device and the reception-side end device.

9. The relay device of claim 1, wherein
the processor determines the transmission rate of the first TCP packet to be transferred to the another relay device, based on a statistical value that is obtained by using transmission time of the first TCP packet to the another relay device and reception time of a positive response for the first TCP packet.

10. A relay device arranged on a path of a Transmission Control Protocol (TCP) packet transmitted and received between a transmission-side end device and a reception-side end device, the relay device comprising:
a processor configured to, based on a result of snooping on a first TCP packet that is addressed to the reception-side end device and received from another relay device arranged between the transmission-side end device and the relay device on the path, generate a second TCP packet including a negative response or a positive response and transmit the generated second TCP packet to the another relay device; and
a memory configured to store a copy of the first TCP packet addressed to the reception-side end device, wherein
when it is found, as a result of snooping on a third TCP packet received from the reception-side end device, that the third TCP packet includes a negative response regarding reception of the first TCP packet relayed to the reception-side end device, the processor performs retransmission of the first TCP packet to the reception-side end device by using the copy of the first TCP packet stored in the memory; and
when it is found that the third TCP packet includes a positive response regarding the reception of the first TCP packet relayed to the reception-side end device, the processor discards the copy of the first TCP packet stored in the memory;
wherein the processor is further configured to determine, based on the packet information obtained by snooping the first and second TCP packets, at least one of a transmission rate and congestion detection.

11. A method being performed by a relay device arranged on a path of a Transmission Control Protocol (TCP) packet transmitted and received between a transmission-side end device and a reception-side end device, the method comprising:
snooping on a first TCP packet that is addressed to the reception-side end device and received from the transmission-side end device and on a second TCP packet that is addressed to the transmission-side end device and received from another relay device arranged between the relay device and the reception-side end device on the path;
storing packet information obtained by the snooping in a memory;
performing first communication control between the relay device and the another relay device based on the packet information, the first communication control being independent of second communication control that is performed between the transmission-side end device and the reception-side end device; and
determining, based on the packet information obtained by snooping the first and second TCP packets, at least one of a transmission rate and congestion detection.

12. A system comprising:
a first relay device arranged on a path of a Transmission Control Protocol (TCP) packet that is transmitted and received between a transmission-side end device and a reception-side end device; and
a second relay device arranged between the first relay device and the reception-side end device on the path, the first relay device including
a first memory configured to store packet information obtained by snooping on a first TCP packet that is addressed to the reception-side end device and received from the transmission-side end device and on a second TCP packet that is addressed to the transmission-side end device and received from the second relay device, and
a first processor configured to perform first communication control between the first relay device and the second relay device based on the packet information, the first communication control being independent of second communication control that is performed between the transmission-side end device and the reception-side end device;
wherein the first processor determines, based on the packet information obtained by snooping the first and second TCP packets, at least one of a transmission rate and congestion detection.

13. The system of claim 12, wherein
when the first TCP packet received from the transmission-side end device is relayed to the second relay device, the first memory of the first relay device stores a copy of the first TCP packet;
when it is found, as a result of snooping on the second TCP packet received from the second relay device, that the second TCP packet includes a negative response regarding reception of the first TCP packet relayed to the second relay device, the first processor of the first relay device performs retransmission of the first TCP packet by using the copy of the first TCP packet stored in the first memory; and
the second relay device includes
a second memory configured to, when the first TCP packet is relayed from the first relay device to the reception-side end device, store a copy of the first TCP packet, and
a second processor configured:
to, when it is found, by snooping on a third TCP packet received from the reception-side end device, that the third TCP packet includes a negative response regarding reception of the first TCP packet relayed to the reception-side end device, perform retransmission of the first TCP packet to the reception-side end device by using the copy of the first TCP packet, and
to, when it is found, by snooping on the third TCP packet received from the reception-side end device, that the third TCP packet includes a positive response regarding the reception of the first TCP packet relayed to the reception-side end device, discard the copy of the first TCP packet stored in the second memory.

* * * * *